United States Patent [19]

Parekh

[11] Patent Number: 4,845,963

[45] Date of Patent: Jul. 11, 1989

[54] REINFORCING FABRIC FOR POWER TRANSMISSION BELTS, HOSES AND THE LIKE

[75] Inventor: Dhan Parekh, Columbus, Ga.

[73] Assignee: WestPoint Pepperell, Inc., West Point, Ga.

[21] Appl. No.: 180,435

[22] Filed: Apr. 12, 1988

[51] Int. Cl.[4] .............................................. D04B 7/16
[52] U.S. Cl. ........................................ 66/170; 66/193; 66/202; 428/102; 428/105; 428/107; 428/109; 428/114; 428/192; 428/229; 428/253; 428/257; 428/224; 474/267
[58] Field of Search ................. 66/170, 193, 190, 191, 66/192, 202; 428/102, 105, 107, 108, 114, 290, 229, 257, 253, 192, 109, 224; 474/267

[56] References Cited

U.S. PATENT DOCUMENTS

| | | | |
|---|---|---|---|
| 3,478,613 | 11/1969 | Waugh et al. | 74/233 |
| 3,564,933 | 2/1971 | Clinkenbeard | 74/233 |
| 3,820,409 | 6/1974 | Meadows | 74/233 |
| 3,863,515 | 2/1975 | Meadows | 74/231 R |
| 3,941,005 | 3/1976 | Gardiner, III | 74/233 |
| 3,987,684 | 10/1976 | Fisher et al. | 74/233 |
| 4,011,766 | 3/1977 | Waugh | 74/234 |
| 4,131,030 | 12/1978 | White, Jr. | 74/232 |
| 4,139,406 | 2/1979 | Richmond et al. | 156/140 |
| 4,169,393 | 10/1979 | Wetzel et al. | 74/233 |
| 4,177,688 | 12/1979 | Howerton et al. | 74/233 |
| 4,255,147 | 3/1981 | Miranti, Jr. | 474/262 |
| 4,298,645 | 11/1981 | Obayashi et al. | 428/257 |
| 4,305,713 | 12/1981 | Imamura | 474/238 |
| 4,364,887 | 12/1982 | Becht et al. | 264/171 |
| 4,472,086 | 9/1984 | Leach | 428/257 |
| 4,518,640 | 5/1985 | Wilkens | 428/257 |
| 4,550,045 | 10/1985 | Hutson | 428/105 |
| 4,650,068 | 3/1987 | Vanassche et al. | 428/257 |
| 4,677,831 | 7/1987 | Wunner | 66/190 |

FOREIGN PATENT DOCUMENTS 0817109 3/1981 U.S.S.R. ............................ 428/229

OTHER PUBLICATIONS

Article from Textile Month, Oct. 1987, entitled "Multi-axial Fabrics for Heavy-Duty Use", 3 pages.
Brochure of Karl Mayer Textilmaschinenfabrik GmbH.

Primary Examiner—James J. Bell
Attorney, Agent, or Firm—Schweitzer & Cornman

[57] ABSTRACT

A reinforcing fabric, for power transmission belts, hoses and the like is formed by upper and lower sets of non-interlaced, crossing bias yarns, set at a wide angle, such as 120° during the construction of the fabric. At selected crossing points, bias yarns from the respective sets are engaged by loop portions of longitudinally extending lines of stitching. The yarns are pre-impregnated with an elastomeric or other agent to increase stiffness, prior to the construction of the fabric. The bias yarns may be designed with significantly greater flexibility than with conventional fabrics and with lower twist and higher density than conventional. Many of the labor-intensive operations of conventional reinforcing fabrics are eliminated when using the new fabric. In one version, the longitudinal stitching, securing one set of bias yarns to the other, is melted during the curing process, when the reinforcing material is incorporated into the article to be reinforced.

12 Claims, 2 Drawing Sheets

REINFORCING FABRIC FOR POWER TRANSMISSION BELTS, HOSES AND THE LIKE

BACKGROUND AND SUMMARY OF THE INVENTION

In connection with the manufacture of endless power transmission belts, such as V-belts, gear belts, and the like, it is conventional to utilize a construction of fabric reinforced rubber or other elastomer. Typically, the belt structure includes a cord winding layer, which is located along the "neutral" axis of the belt. Cross sectional areas of the belts above and below the neutral axis are subject to flexing in tension and/or compression. In a typical endless belt, for example, outer portions of the belt cross section are flexed in tension, as the belt passes around the sheaves over which it is trained. The inner cross sectional portion of the belt are subjected to flexing in compression. For some installations, a single belt may be required to pass over both internal and external sheaves, such that both the inner and outer cross sectional portions thereof are flexed in both tension and compression.

In a transmission belt of conventional construction, strips of reinforcing fabric are incorporated into the elastomeric material of the belt, in the inner and outer cross sectional areas thereof, to impart stability to the belt geometry. Since these areas of the cross section undergo flexing in tension and/or compression, it has been customary to utilize bias-type fabric for the reinforcing material, so that the yarns of the fabric do not extend parallel to the longitudinal axis of the belt, but are arranged at angles thereto. Such reinforcing fabrics can be both wrapped around the exterior of the belt or incorporated internally thereof.

Pursuant to prior practice, the manufacture of bias-type reinforcing fabric has been extremely labor intensive, and therefore costly, and at the same time less than optimally effective for the purpose. In one commonly used procedure, for example, tubular woven fabric is slit along a spiral at an angle of about 75° to the longitudinal axis of the fabric tube. The continuous strip resulting from the bias slitting of the tube has its yarns disposed asymmetrically with respect to the longitudinal axis of the fabric strip. Accordingly, the slit fabric strip is thereafter asymmetrically elongated to reorient the yarns somewhat, in an effort to bring them closer to symmetrical angles of about 30° on either side of the longitudinal axis. The length of slit fabric is impregnated with uncured elastomeric material and then banner cut into short sections, at an angle of about 60° to the axis of the slit fabric. The banner cutting results in a series of parallelogram-shaped sections. These are rotated 90° and then spliced by overlapping. This results in a spliced length of material, in which the yarns are arranged at an angle of around 120°, symmetrical to the longitudinal axis of the spliced length. This assembled length is later slit into narrower lengths, appropriate to the desired end use.

Because of crowding of the yarns at the edge extremities of the tubular woven material, a continuous length of the bias cut fabric has periodic diagonal non-uniformities. If allowed to remain in the fabric, these can result in undesirable puckering, bagging or wrinkling. Accordingly, it is often necessary to cut away and discard these sections before banner cutting.

It will be readily apparent from the above that the manufacture and installation of conventional reinforcing materials is a significant labor factor in the manufacture of a power transmission belt. Bias fabrics manufactured in conventional ways have several additional inherent disadvantages. For one, the yarn angles, which ideally are normally about 120° (60° to the longitudinal axis), are very difficult to obtain and control with conventional fabrics, which are woven at 90° and are distorted, by stretching, banner cutting, turning and splicing, in an effort to achieve a symmetrical 120° yarn angle. Precision in achieving the desired angle is difficult, and maintaining the angle during the manufacturing process is also difficult. Additionally, the structure of conventional fabric inherently involves interlacing of the yarns, creating areas of excess wear at the crossover points. Further, the weaving process requires the yarn to have a strength greater than that which is required of the yarn in order to perform its reinforcing function. This requires a higher than necessary level of twist in the yarn, which in itself reduces flexibility of the fabric.

The present invention relates to a novel and significantly improved reinforcing fabric, useful particularly for reinforcement of power transmission belts, hoses and the like. The fabric of the invention is constructed in the first instance with its principal yarns disposed at an optimum wide angle, such as 120°. This of course eliminates the need for the labor-intensive procedures of bias cutting, stretching, banner cutting, turning and splicing the fabric before use. Also in accordance with the invention, the fabric is constructed with its principal yarns laid one over the other, but not interlaced, so that the usual areas of rapid wear, which are inherent in conventional fabrics, are eliminated.

In accordance with one aspect of the invention, the reinforcing fabric is constructed on a special Raschel machine, wherein the principal bias yarns are secured at certain crossover points by longitudinally extending lines knitted stitches, sometimes referred to as pillar stitches, spaced widthwise across the fabric and extending longitudinally thereof. The longitudinal stitching desirably is a lightweight yarn, sufficient merely to maintain the integrity of the fabric during manufacture and assembly.

To particular advantage, the stitching yarns can be formed of a material of a low melting point, which can melt away and dissolve during the curing or vulcanizing procedures which form part of the belt manufacturing operation. As a result, there is minimum restraint of one set of bias yarns by the other, so that each is free to perform its reinforcing function in an optimum manner.

The straight yarn fabric structure of the invention provides a greatly superior reinforcing fabric for use in the manufacture of power transmission belts, hoses and the like. At the same time, the fabric structure of the invention eliminates significant manufacturing steps and other cost factors which are involved in the production of conventional reinforcing fabrics.

Among the important advantages of the new fabric structure is its highly superior flexibility. Greater flexibility has been the subject of decades of research and development in the power transmission belt industry, but has always been restricted by the need for having certain yarn characteristics and certain fabric characteristics dictated largely by the fabric manufacturing process. The fabric of the present invention, on the other hand, enables the yarn and fabric characteristics to be optimized especially for the desired end use, rather than the limitations of the manufacturing process. In this respect, the new fabric represents a quantum improvement over reinforcing fabrics of known construction.

For a more complete understanding of the above and other features and advantages of the invention, reference should be made to the following detailed description of a preferred embodiment of the invention and to the accompanying drawings.

DESCRIPTION OF A PREFERRED EMBODIMENT OF THE INVENTION

Figure 1:
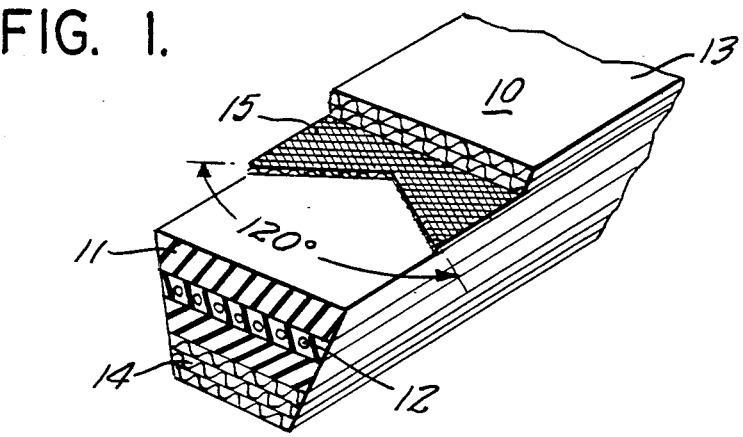
FIG. 1 is a cross sectional view of a typical V-belt incorporating one or more layers of reinforcing fabric constructed in accordance with the principles of the invention.

Referring now to the drawing, the reference numeral 10 designates in a general way one of the common forms of power transmission belt, the so-called V-belt, which is actually trapezoidal in cross section. The belt 10 typically is of an endless configuration, adapted to be trained about two or more grooved sheaves. The belt has a body 11 of elastomeric material, in which is embedded a layer of windings 12 extending longitudinally of the principal axis of the belt. The design and construction of the belt is such that the cord windings 12 lie substantially along the "neutral" axis of the belt. When the belt flexes, in passing over sheaves (not shown) the outer portions 13 of the belt are caused to flex in tension, while the inner portions 14 of the belt flex in compression. The cord winding 12, being substantially at the neutral axis, is substantially isolated from the tension or compression flexing, as will be understood.

In a power transmission belt of conventional construction, the outer portions 13, 14 of the belt typically and conventionally are provided with one or more layers 15 of reinforcing fabric 15. To accommodate the tension and compression flexing of the outer portions of the belt, the reinforcing fabric layers 15 are arranged such that their yarns do not run longitudinally and transversely of the belt, but ideally are arranged at a relatively wide angle thereto. Quite typically, the yarns may be disposed symmetrically, at an angle of about 60° relative to the longitudinal axis of the belt (i.e., at an included angle of about 120°). The use and/or orientation of such fabrics is, in generally known, and forms no part of the present invention. The present invention is, on the other hand, directed to a new and improved form of such reinforcing fabric, which is functionally far superior to conventional fabrics and may be produced and used with significantly fewer processing steps.

Figure 2:
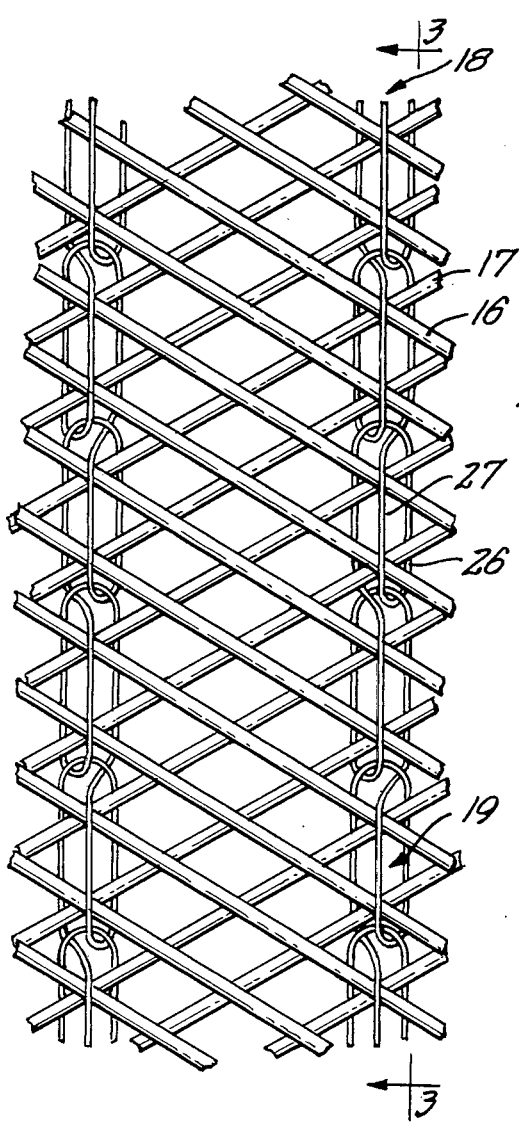
FIG. 2 is a highly enlarged, top plan view of a straight yarn reinforcing fabric constructed in accordance with the principles of the invention and useful to great advantage in the construction of a belt of the type shown in FIG. 1.
Figure 3:
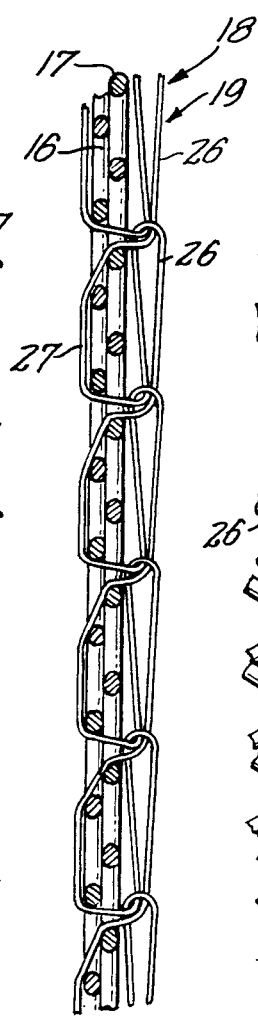
FIG. 3 is a cross sectional view as taken generally on line 3—3 of FIG. 2.
Figure 4:
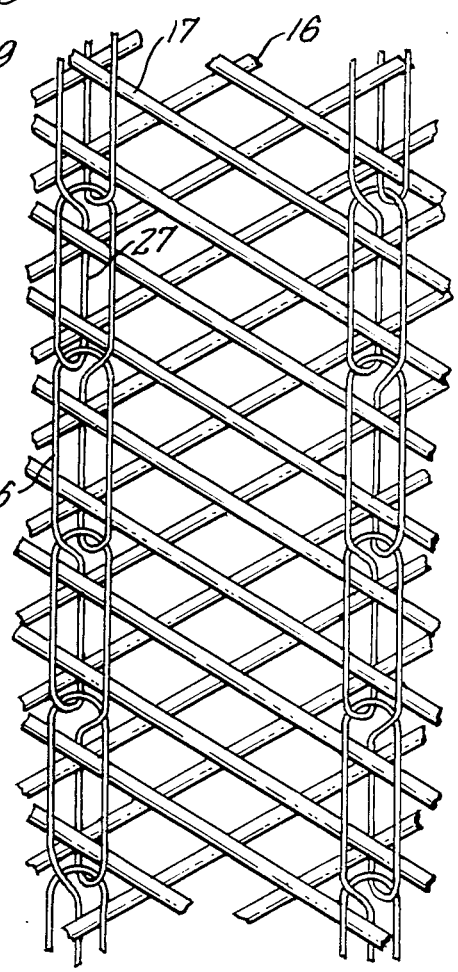
FIG. 4 is a view, similar to FIG. 2, showing the reverse side of the reinforcing fabric.

The construction according to the invention of a reinforcing fabric 15 is illustrated in FIGS. 2-4. With respect to the top plan of FIG. 2, the numerals 16, 17 identify upper and lower bias yarns, which extend diagonally across the full width of the fabric. In the illustration, the lower bias yarns 17 extend from left to right in the direction in which the fabric is constructed, while the upper bias yarns 16 extend from right to left. The overall width of the fabric is a function of the machine construction and may be as much as sixty inches, for example.

Within the contemplation of the invention, the bias yarns 16, 17 may be disposed at different angles, although typically and advantageously the yarns are disposed at an angle of approximately 60° to the axis on which the fabric is constructed, providing a symmetrical angle between yarns of the upper and lower groups of approximately 120° While an angle of 120° is optimum for most purposes, reinforcing fabrics may be desired with yarn angles of from 95° to 140°, but more preferably from about 110° to about 130°.

To particular advantage, the reinforcing fabric of the invention is constructed on a Raschel warp knitting machine, and particularly the so-called "RS2DS" Raschel machine as made available as of the filing date hereof by Karl Mayer Textilmaschinenfabrik GmbH, Obertshausen, West Germany. With the RS2DS2 Raschel equipment, the respective upper and lower bias yarns are laid diagonally across the fabric, from one side to the other, back and forth over the full length of the fabric. The bias yarns are thus laid-in in the diagonal configuration shown in FIG. 2. The respective upper and lower bias yarns 16, 17 are then secured in place by side-by-side chains 18 of knitted loops 19, referred to as pillar stitching, running the full length of the fabric and spaced apart so as to engage the bias yarns at alternate crossover points across the width of the fabric.

Figure 5:
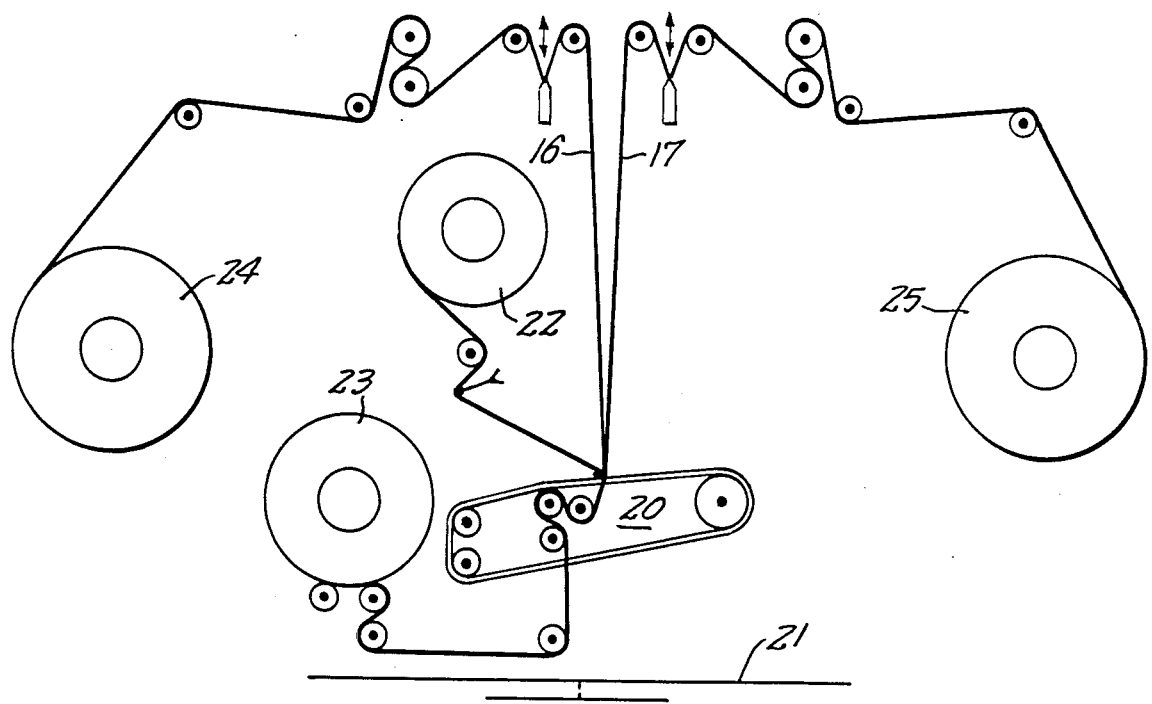
FIG. 5 is a highly simplified, schematic representation of a Raschel type machine used in the construction of reinforcing fabric according to the invention.
Figure 6:
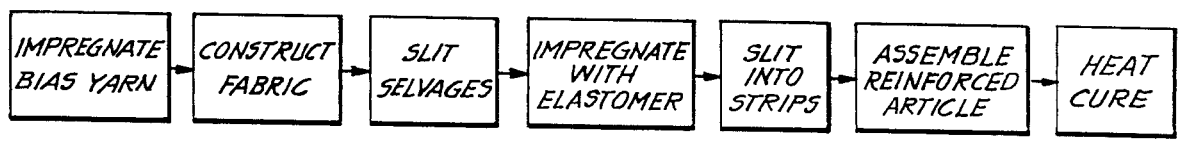
FIG. 6 is a simplified flow diagram of a typical procedure for making and using the new fabric.

Referring to FIG. 5, there is shown a highly schematic illustration of the RS2DS Raschel equipment as set up for constructing the fabric of the invention. The knitting works, generally designated by the reference numeral 20 is mounted on a large turntable 21, so as to be bodily rotatable. Also mounted on the turn table and rotatable therewith is a beam 22 carrying multiple yarns for the longitudinal chains 18 of pillar stitching, and a windup roll 23 for the finished fabric. Stationary beams 24, 25 supply the respective bias yarns 16, 17 to the rotating knitting works 20, enabling the bias yarns to be laid in diagonally across the width of the fabric in the manner desired.

The chains 18 of stitched loops 19 are so constructed into the fabric as to form a series of individual loops 26, extending along the bottom surface of the fabric and integrated with vertical loops 27, which extend through the bias yarns 16, 17, over the tops of some of them, and then back down, exiting through the loop structure 26. Typically, the vertical loop sections 27 pass over and about a single crossing pair of bias yarns (and perhaps other yarns crossing in different directions). In the illustrated fabric, however, the vertical loops 27 pass over the top of, and confine, two adjacent pairs of upper and lower bias yarns at two successive crossover points. In this respect, in commercially available RS2DS equipment, needle gaging is either six or twelve (per inch). For optimum construction of a reinforcing fabric according to the principles of the present invention, a considerably greater number of yarns per inch is desired for the respective upper and lower bias yarns 16, 17. Accordingly, in the construction of the fabric on the RS2DS machine, bias yarns are laid on the needles in pairs so that, with a twelve gauge machine, it is possible to achieve twenty-four bias yarns per inch. Accordingly, the chains 18, of the pillar stitching, engage successive pairs of upper bias yarns and lower bias yarns, at their respective crossover points. This structure is clearly evident in FIG. 3, for example According to the invention, the respective bias yarns 16, 17 will be the primary structural yarns in the reinforcing fabric when the fabric is incorporated into the belt structure. The strength required for this purpose is, however, considerably less than the strength required of yarns for conventional weaving processes. In other words, with conventional bias cut reinforcing fabrics, it is necessary to design the bias yarns to have the strength necessary to withstand the weaving operation, as well as the stretching and shifting necessary to achieve a proper yarn angle in calendering. This necessitates a considerably higher degree of twist than is required for the reinforcing task alone. As a result, the conventional bias yarns are much stronger than either necessary or desirable, which is a cause of reduced operating life. In the fabric of the present invention, the bias yarns may be of very low twist, for example, 10.8 twists per inch, as compared to conventional constructions which would utilize approximately 15.9 twists per inch. Many advantages result from this, beginning with the fact that the yarn is more flexible and thus better for its intended purpose. The yarn is bulkier which allows better penetration of processing elastomeric material with which the yarns are impregnated. Further, the yarns are less costly, because of the fact that the lower twist ratio increases productivity at the yarn manufacturing stage. Indeed, because of the low twist requirements, it is possible to use open end yarn, which is better in quality and lower in cost. With conventional fabrics, ring spun yarns normally are required because of the considerably higher twist requirements.

For one advantageous reinforcing fabric structure, having a fabric weight of approximately 8.0 ounces per square yard, bias yarns of 50/50 poly/cotton were employed, having a cotton count of 11/1, 24×24 ends per inch. Desirable materials for the lines of pillar stitching are 70 denier textured polyester, 80 denier textured polypropylene and 80 denier monofilament nylon. The first mentioned material has the advantage of lowest cost, but does not melt at normal curing temperatures for typical elastomers used in belt manufacture. For particularly advantageous fabric constructions according to the invention, textured polypropylene and monofilament nylon are preferred materials for the pillar stitching, because these materials will melt and dissolve during the curing procedures to which the belt is normally exposed. Of these two, the monofilament nylon is to be preferred, and optimally a four mil nylon monofilament made available as of the filing date hereof by Shakespeare Monofilament, Columbia, South Carolina, under its trademark "SF-47". The monofilament nylon has a melting temperature of approximately 226° F., as compared to normal curing temperatures of at least about 325° F. for a typical elastomeric material used in the manufacture of power transmission belts. Textured polypropylene, a satisfactory alternative, melts at approximately 322° F.

In the manufacture of reinforcing fabric according to the invention, the bias yarns, prior to construction of the fabric, are pretreated as in a slashing operation by immersion in a bath containing an elastomeric composition and/or a sizing of flexible polymeric material. A particularly preferred composition for this purpose is an elastomeric composition such as a water-based resorcinal formaldehyde, rubber cement or starch/wax size composition. The yarn is dipped into this composition and heat cured, in order to stabilize the yarns. The relatively open construction of the yarns allows good penetration of the solution into the interior of the yarn, and provides for a pick up of about two to seven percent dry weight basis.

This preliminary dipping of the yarns, which is not possible with conventionally woven fabrics, serves several advantageous purposes. It imparts to the bias yarns a relatively high degree of stability and resistance to distortion in the fabric forming process, and thus facilitates the subsequent handling and processing of the fabric. Additionally, the established bias angle is stabilized and does not tend to change during subsequent handling of the fabric. It also facilitates trimming of a predetermined amount of "selvage" from each longitudinally extending edge of the finished fabric after the knitting process. This is desired at some stage, prior to incorporation of the fabric into belting material, because the bias yarns undergo a change of direction at the fabric edges (i.e., left-to-right yarns become right-to-left yarns), such that the structure of the fabric at the edge extremities is slightly different from elsewhere in the fabric. By trimming these extremities away, the entire remaining fabric is of uniform characteristics.

In this respect, unlike conventional bias-cut fabrics, where the selvages appear periodically as diagonal non-uniformities, the selvages of the present fabric lie along the edge extremities only, and even after removal of the selvages, the fabric remains as a continuous, elongated web or strip. With the conventional fabrics, if the original selvage areas are allowed to remain in the fabric, in order to provide continuity to the fabric strip, the eventual product likely will be defective as a result of puckering, bagging and/or wrinkling of the reinforcing fabric occasioned by inclusion of these selvage areas. Accordingly, for many uses at least, the diagonal selvage areas are excised before the reinforcing material is incorporated into the article to be reinforced. This results in considerable waste of material.

An additional advantage of the preliminary yarn dipping procedure, as called for herein, resides in the fact that a low viscosity solution may be employed at that stage. This provides for good penetration of the solution and tends to prevent bridging and filming, which can occur when solutions are applied after fabric construction. The presence of filmed-over areas of course weakens the ultimate product by preventing subsequent penetration and impregnation by the elastomeric composition when the reinforcing fabric is readied for assembly with the uncured elastomeric material of the belt or hose.

In a procedure according to the present invention, the continuous web of straight yarn fabric, usually after trimming of the selvages, is impregnated with an uncured tacky elastomeric composition, compatible with the elastomeric material of the belt or other article to be reinforced. The elastomeric material itself forms no part of the present invention. The impregnated web may then be slit into continuous, elongated strips of appropriate width for installation in the article to be reinforced.

After assembly of the power transmission belt or other reinforced article, the article is conventionally cured by heat, and typically this involves heating to temperatures above 325° F. In any of the forms of the invention in which the rows of pillar stitching are formed by low temperature yarns, these yarns will melt and dissolve during the curing operation such that, in the finished product, the respective sets of bias yarns are completely free of attachment, one to the other, allowing for maximum freedom of flexing movement.

For certain products, such as hoses, where the shape of the article requires significant compound curvature of the reinforcing fabric, it may be advantageous to utilize bias yarns having at least limited stretch characteristics. This serves to further enhance the high degree of flexibility of the reinforcing fabric as will be readily appreciated. The construction of the reinforcing fabric according to the invention of course facilitates the use of yarns having stretch characteristics. This is realized because of the limited physical requirements of the bias yarns, as compared to the requirements of yarns to be utilized in the weaving of fabric in accordance with conventional techniques, for example.

A significant aspect of the invention is the specific adaptation of the capabilities of the Mayer RS2DS Raschel equipment for the specific and unique requirements of the reinforcement of power transmission belts, hoses and the like. The ability of this equipment to construct a straight yarn fabric, laying yarn at a wide angle, makes it ideal for adaptation to the direct manufacture of a bias yarn reinforcing fabric. Production of the reinforcing fabric in this manner represents a highly significant advance over conventional techniques for manufacturing this particular product, both in terms of its far superior performance and in terms of its substantially reduced labor requirements.

The procedures of the invention enable reinforcing fabric to be produced in virtually endless lengths, of any appropriate width, with uniform physical characteristics throughout. By contrast, conventional reinforcing fabric must be either be cut into short lengths, in order to excise the aberrational selvage areas, or else the end product is subject to becoming prematurely defective through puckering, bagging or wrinkling of the reinforcing fabric in the region of the selvage portions.

Independently of the above, fabric constructed in accordance with the invention can be optimized for its reinforcing function by design and selection of the bias yarns to have characteristics principally suited for the reinforcing function. If necessary or desirable, warp and/or fill yarns can be incorporated into the structure to achieve particular additional functions. The indicated Raschel equipment readily accommodates the inclusion of such additional yarns during construction of the fabric. The additional yarns, if used, are laid in without interlacing.

The construction of the present invention permits, for example, the use of bias yarns having twist levels as low as about 10.8 twists per inch, as compared around 15.9 twists per inch for conventional fabrics. In some cases, this will accommodate the use of open end spun yarns, which enable reduction in manufacturing costs to be realized. At the same time, more optimum performance is also realized through the greater flexibility of the reinforcing yarns. By contrast, conventional reinforcing fabrics require the yarns to be designed with characteristics principally suited for the weaving, stretching and re-orienting processes, which in many ways are inconsistent with characteristics required and desired for the reinforcing task.

An important advantage of the new fabric is that there is no interlacing between the respective sets of bias yarns. In conventional woven fabrics, for example, crossing yarns are interlaced over and under, creating a wear point at each crossing. The existence of these wear points accelerates the eventual failure of the reinforced article.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. A straight yarn reinforcing fabric for power transmission belts, hoses and the like, which comprises
    (a) a set of upper bias yarns extending in one direction from one edge to the other of said fabric,
    (b) a set of lower bias yarns extending in a second direction from one edge to the other of the fabric,
    (c) said upper and lower bias yarns crossing in contact without interlacing,
    (d) longitudinal lines of knitted stitch loops extending lengthwise of said fabric, and having portions extending through the fabric in the thickness direction and engaging crossing pairs of upper and lower bias yarns for securing together layers of said upper and lower bias yarns,
    (e) said bias yarns being spun yarns and being impregnated with an elastomeric agent prior to production of said fabric.

2. A straight yarn reinforcing fabric according to 1, further characterized by
    (a) said lines of knitted loops being formed of a material having a melting point below about 325° F., and
    (b) said bias yarns being formed of a material having a melting point substantially above 325° F.

3. A straight yarn reinforcing fabric according to claim 2, further characterized by
    (a) said knitted loops being formed of monofilament nylon having a melting point of about 226° F.

4. A straight yarn reinforcing fabric according to claim 2, further characterized by
    (a) said bias yarns being formed of a spun poly-cotton material having a twist substantially less than 15.9 per inch.

5. A reinforcing material comprising an elongated strip of the fabric of claim 1, slit along both lateral edges and impregnated with an uncured elastomeric material.

6. A reinforcing material comprising an elongated strip of the fabric of claim 1, further characterized by
    (a) said bias yarns being disposed symmetrically at an angle to the longitudinal axis of the fabric of greater than 45°.

7. A reinforcing material comprising an elongated strip of the fabric of claim 1, further characterized by
    (a) said elastomeric agent comprising a liquid solution of elastomeric material applied at approximately 2 to 7% of the dry weight of the fabric.

8. A fabric-based reinforcing material for power transmission belts, hoses and the like, which comprises
    (a) an elongated strip of straight yarn fabric slit along both edges,
    (b) said fabric including first and second sets of bias yarns,
    (c) each of said sets of bias yarns being arrayed in parallel relation and in a common plane, one above the other, with the yarns of one set being disposed at an angle of from about 95° to about 140° to the yarns of the other set substantially symmetrical to the longitudinal axis of the fabric,
(d) a plurality of closely laterally spaced rows of stitching extending longitudinally of said fabric and having loops extending through the fabric and each engaging at least one bias yarn from each set,
(e) said fabric being impregnated with an uncured elastomeric material compatible with the article to be reinforced.

9. The fabric-based reinforcing material of claim 8, further characterized by
(a) said rows of stitching being formed of a material having a melting temperature below the curing temperature of said elastomeric material.

10. The fabric-based reinforcing material of claim 8, further characterized by
(a) said bias yarns being formed of spun yarns having a twist of substantially less than 15.9 per inch.

11. The fabric-based reinforcing material of claim 8, further characterized by
(a) said loops of said rows of stitching each engaging two longitudinally successive bias yarns from each set thereof.

12. The fabric-based reinforcing material of claim 8, further characterized by
(a) said bias yarns, prior to incorporation into said fabrics, having been impregnated with about 2 to 7% of the weight of the dry yarn with an elastomeric agent compatible with said elastomeric material.

* * * * *